(12) United States Patent
Jain et al.

(10) Patent No.: US 6,950,873 B2
(45) Date of Patent: Sep. 27, 2005

(54) APPARATUS AND METHOD FOR PORT SHARING A PLURALITY OF SERVER PROCESSES

(75) Inventors: Vinit Jain, Austin, TX (US); Dwip N. Banerjee, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 760 days.

(21) Appl. No.: 09/920,457

(22) Filed: Aug. 2, 2001

(65) Prior Publication Data

US 2003/0028681 A1 Feb. 6, 2003

(51) Int. Cl.[7] .............................................. G06F 15/17
(52) U.S. Cl. ..................... 709/228; 709/203; 719/313; 719/320
(58) Field of Search ................................. 709/200–203, 709/227–253; 710/15; 719/310–320; 370/351–430, 466

(56) References Cited

U.S. PATENT DOCUMENTS

| | | | | |
|---|---|---|---|---|
| 6,363,081 B1 | * | 3/2002 | Gase | 370/466 |
| 6,385,197 B1 | * | 5/2002 | Sugihara | 370/380 |
| 6,560,660 B1 | * | 5/2003 | Flanagin | 710/15 |
| 2002/0016856 A1 | * | 2/2002 | Tallegas et al. | 709/238 |
| 2002/0016868 A1 | * | 2/2002 | Peacock | 709/321 |

* cited by examiner

Primary Examiner—St. John Courtenay, III
(74) Attorney, Agent, or Firm—Duke W. Yee; Herman Rodriguez; Betty Formby

(57) ABSTRACT

An apparatus and method for port sharing among a plurality of server processes are provided. The apparatus and method provide an intermediate layer between the communication port and the server processes. This intermediate layer provides a port mapping such that data messages received via a shared communication port are mapped to separate ports based on the domain of the data message. Each server process is configured to listen to a different virtual communication port. The mapping of the present invention maps data messages received in the shared communication port to one of these virtual communication ports based on the domain to which the data message belongs. This mapping is also performed with outgoing messages from the server as well.

30 Claims, 3 Drawing Sheets

| SHARED PORT/ADDRESS | MAPPED PORT/ADDRESS |
|---|---|
| www.gfxclabel.com.80 | www.gfxclabel.com.81 |
| www.herbsshoes.com.80 | www.herbsshoes.com.82 |
| www.bonnibonbon.com.80 | www.bonnibonbon.com.83 |
| www.jerryjackets.com.80 | www.jerryjackets.com.84 |

APPARATUS AND METHOD FOR PORT SHARING A PLURALITY OF SERVER PROCESSES

BACKGROUND OF THE INVENTION

1. Technical Field

The present invention is directed to an improved data processing system. More specifically, the present invention is directed to an apparatus and method for port sharing among a plurality of server processes.

2. Description of Related Art

Communication with applications running on a server is typically performed using ports and addresses assigned to the application and the server apparatus. A port may be a physical port or a logical port. A physical port is a pathway into and out of a computer or a network device such as a switch or router. For example, the serial and parallel ports on a personal computer are external sockets for plugging in communications lines, modems and printers. Every network adapter has a port (Ethernet, Token Ring, etc.) for connection to the network. Any device that transmits and receives data implies an available port to connect to each line.

A logical port is a number assigned to an application running on the server by which the application can be identified. While a server may have a single physical port, the server may make use of a plurality of logical ports. The combination of a logical port identifier and the address of the server apparatus is referred to as a socket.

The address of the server is a network address that identifies the server in the network and how to route data to a particular physical port of the server through the network. The address may take the form of a Uniform Resource Locator (URL), or in the case of the Internet, an Internet Protocol (IP) address such as 205.15.01.01, or the like. The address is included in headers of data packets transmitted by a device. The data packets are routed through the network from device to device by reading the header of the data packet and determining how to route the data packet to its intended destination based on the address.

Once the data packet arrives at the intended destination server apparatus, the server determines the destination application based on the logical port identifier included in the header information of the data packet. A data packet may be directed to a particular logical port by including the logical port identifier in its header information.

An application on a server **retrieves data by "listens" to a logical port by retrieving data having a logical port identifier that identifies the logical port associated with that application. The application will take the data directed to its logical port and place it in a queue for the application. In this way, data may be routed through a network to a server apparatus and provided to a particular application on the server apparatus for processing.

Most Internet services are advertised using well known ports on a server. For example, Hypertext Transport Protocol (HTTP) data messages are sent to logical port 80 of a server. The Internet services use the well known ports because most applications, i.e. Internet services, do not know how many logical ports are going to be available on the systems in which they will operate or how they will be configured. Accordingly, rather than forcing a server to change its configuration to accommodate a new application, the applications typically use well known ports that are supported by all server devices.

In addition, most client devices are configured to communicate using these well known ports. For example, client devices typcially communicate HTTP data using well known port 80, as previously described. If a server application or service wishes to be able to communicate with client devices using HTTP, the server application or service will be required to communicate using the well known logical ports that are used by the client devices.

Because most applications use well known ports, servers may be limited to providing a single Internet service with a single server apparatus. This is because each server service will need to monitor the same port for data messages since client devices only communicate with this well known logical port. As a result, each server service will consider all data messages received at a well known logical port to be directed to that service.

Thus, in the prior art systems, although a server service may theoretically be configured to listen to any port, in actuality the server services must all listen to the same port since client devices are limited to communicating with well known ports and the configuration of server apparatuses is not known a priori. As a result, it would be beneficial to have an apparatus and method by which multiple server services may be provided virtually simultaneously and share the same logical port of the server apparatus.

SUMMARY OF THE INVENTION

The present invention provides an apparatus and method for port sharing among a plurality of server processes. The apparatus and method of the present invention provide an intermediate layer between the communication port and the server processes. This intermediate layer provides a port mapping such that data messages received via a shared communication port are mapped to separate ports based on the domain of the data message. Each server process is configured to listen to a different virtual communication port. The mapping of the present invention maps data messages received in the shared communication port to one of these virtual communication ports based on the domain to which the data message belongs. This mapping is also performed with outgoing messages from the server as well.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
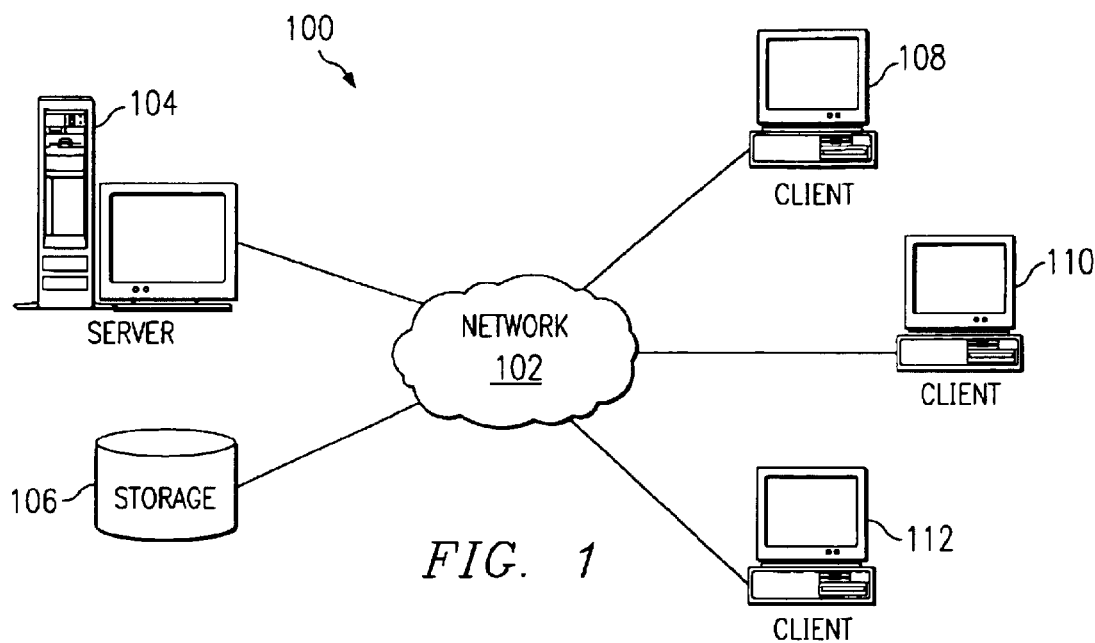
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
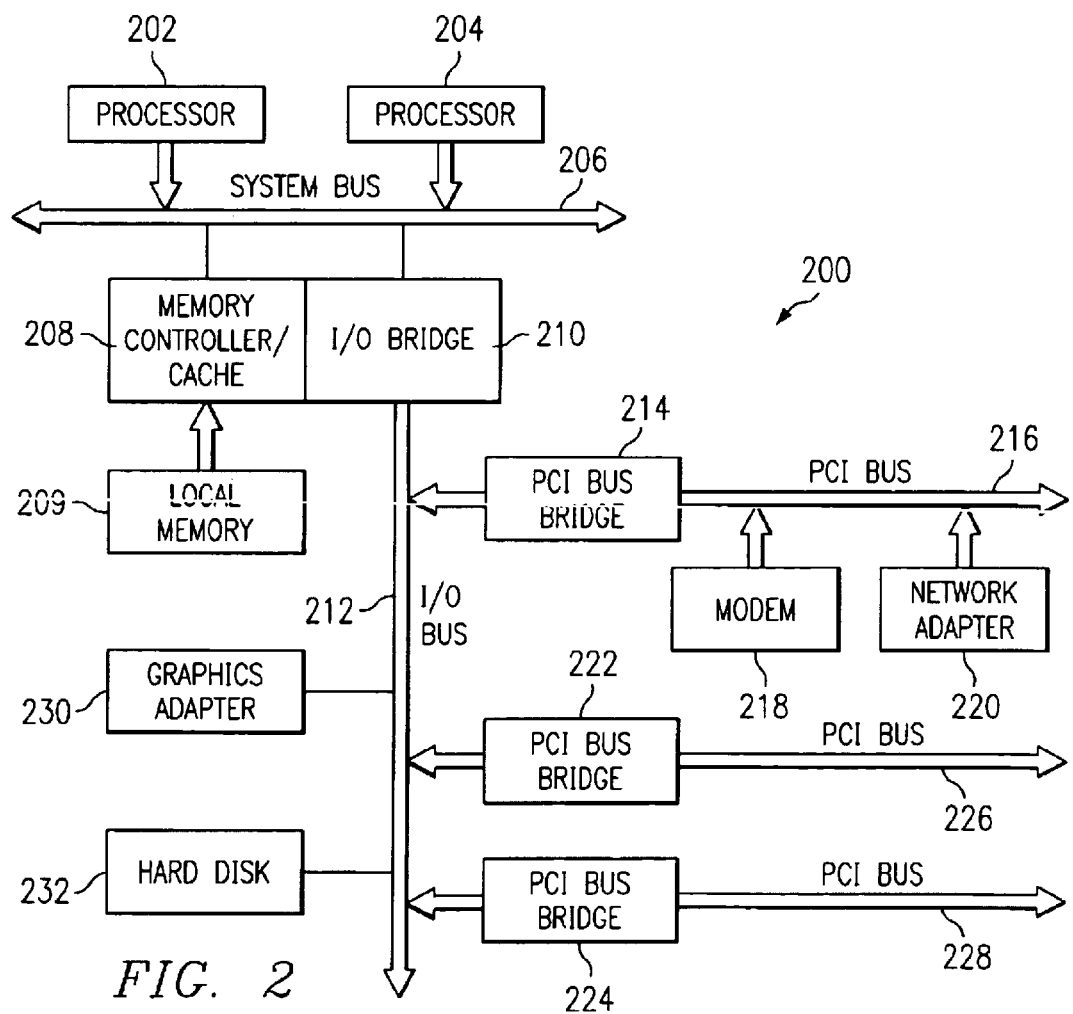
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
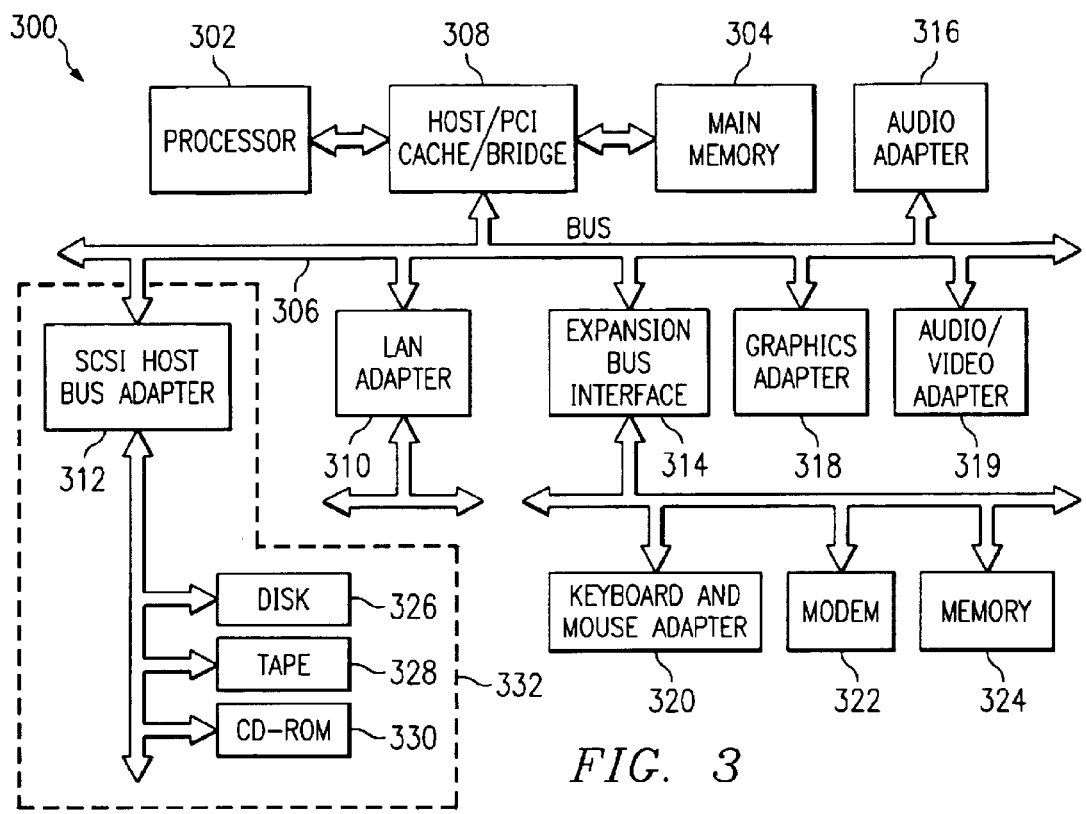
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides an apparatus and method for port sharing among a plurality of server processes. The term "port" as it is used herein, will be in reference to a logical port rather than a physical port.

With the present invention, client devices communicate with server processes in the manner that is generally acceptable in prior art systems. That is, with the present invention, from the viewpoint of the client device, communication with server processes has not changed. The client device will continue to transmit data messages to server processes using well known ports, such as port 80 for HTTP data messages.

However, from the viewpoint of the server processes, the communication with the client devices has changed in that the server processes are now configured to listen to different ports rather than the well known ports. For example, a first server process may be configured to monitor port 81, a second server process may be configured to monitor port 82, a third server process monitors port 83, and the like. The present invention provides a mapping between the well known port used by the client device for communication, and the specific configured ports used by the server processes. In this way, the client devices may continue to communicate without having to alter the communication protocols, and multiple server processes are enabled on the server apparatus making use of the server processes known port configurable characteristics. While externally the server processes appear to listen to well known ports, internally they are using configured ports according to the mapping of the present invention.

With the present invention, when a client device transmits a data message destined for a particular server process, the data message includes a header that identifies the port and address of the server process. The port will be the well known port, such as port 80 for HTTP data messages. The address will define the domain of the server process, such as www.dom1.com or www.dom2.com. Based on this information in the headers or the data packets of the data message, the data packets are routed to the server via the data network.

The data packets are received by the server via a network interface or other communication interface. The data packet header information is read by the present invention to identify the port and address information of the destination for the data packets. The port and address information is then looked up in a mapping table of the present invention. Based on the mapping table, a virtual port is identified for the address specified by the data packet headers. The data packet is then repackaged with a modified header that identifies the virtual port. Because of this repackaging, when the data packet is forwarded to the server processes, a corresponding server process will identify the data packet as being directed to it and will process the data packet appropriately.

In addition to mapping the shared port to configured virtual ports for incoming data messages, the present invention also operates on data messages that are outgoing from the server apparatus. That is, when a server process generates a data message having data packets and headers, the headers of these data packets will identify the configured virtual port of the server process and the server process domain address. The mapping table of the present invention is used prior to transmitting the data packets via the communication interface to thereby, map the configured virtual port to the well known port used by the client devices. Thereafter, the data packet is repackaged with a new header identifying the well known port and the data packet is transmitted to the client device via the data network.

Thus, the present invention provides a mechanism by which multiple server processes may be running at virtual the same time and may make use of a shared communication port. In this way, the server may be shared in such a way as to provide services to multiple domains. This can be extremely beneficial to manufacturers of high end systems as these systems can now be used to run multiple low load servers. For example, the same high end system may be used by an Internet Service Provider to run multiple low load domains for small businesses, e.g., www.johndoe1.com and www.drycleaner1.com.

Figure 4:
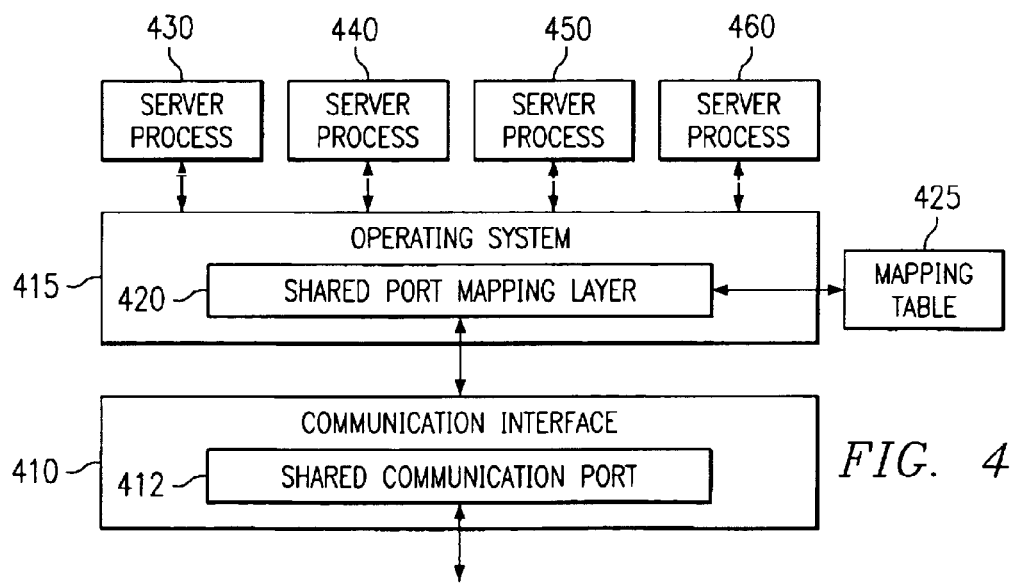
FIG. 4 is an exemplary block diagram illustrating the primary operational components of the present invention.

FIG. 4 is a block diagram illustrating the primary operating elements of the present invention. The elements shown in FIG. 4 may be implemented in software, hardware, or a combination of software and hardware. In a preferred embodiment, the elements shown in FIG. 4 are implemented as software instructions executed by one or more processors, such as processor 202 or 204 in the server apparatus of FIG. 2.

The functions of the present invention, in a preferred embodiment, are performed by the server operating system. That is, the operating system of the server is modified to include instructions for implementing the functions of the present invention as described above. Although the preferred embodiment has the functions of the present invention implemented as software instructions in the operating system of the server apparatus, the present invention is not limited to such. Rather, the present invention may be implemented as a separate application running in conjunction with the operating system or may be implemented as a hardware unit that operates independent of the operating system.

As shown in FIG. 4, the primary operational elements of the present invention, in a preferred embodiment, include a communication interface 410 through which communication with a data network using a shared port 412 may be made and an operating system 415 having a shared port mapping layer 420 that maps data packets received via the shared port 412 in the communication interface 410 to configured ports for the various server processes 430–460. The shared port mapping layer 420 makes use of a mapping table 425 that maps the shared port and address of data packets received from external devices, such as a client device, to a configured port for a corresponding server process 430–460. The shared port mapping layer 420 also maps the configured port and address of data packets received from a server process 430–460 to a shared port and address prior to transmitting the data packets over a data network.

Headers of data packets received from external devices via the shared port 412 in the communication interface 410 are read by the shared port mapping layer 420 of the operating system 415. The headers of the data packets include the port and address of the server process 430–460. The port will be identified as the shared port 412 with the address being the domain address of the appropriate server process 430–460.

The shared port mapping layer 420 looks up the port and address obtained from the header information in the mapping table 425 and determines a configured virtual port for the corresponding process 430–460. The shared port mapping layer 420 then repackages the data packet with a new header having a port identification corresponding to the mapped port. In this way, for example, a data packet destined for www.dom1.com.80 may be mapped to www.dom1.com.81 and a data packet destined for www.dom2.com.80 may be repackaged so that it is destined for www.dom2.com.82, and the like.

The various server processes 430–460 listen to, or monitor, data messages on different ports. For example, server process 430 may listen for messages destined for port 81, server process 440 may listen for messages destined for port 82, and the like. Once the data packets are repackaged, the data packets are forwarded to the server processes 430–460. The server process 430–460 that listens for messages on the particular port identified in the data packet header will receive the data packet and process it accordingly.

In a likewise fashion, when the server process 430–460 sends an outgoing data message, the shared port mapping layer 420 will look up the configured virtual port and address in the mapping table and map this port and address to the shared port and address. Thus, for example, the shared port mapping layer may map a data message source configured virtual port and address from www.dom1.com.82 to www.dom1.com.80.

Figures 5, 6, 7:
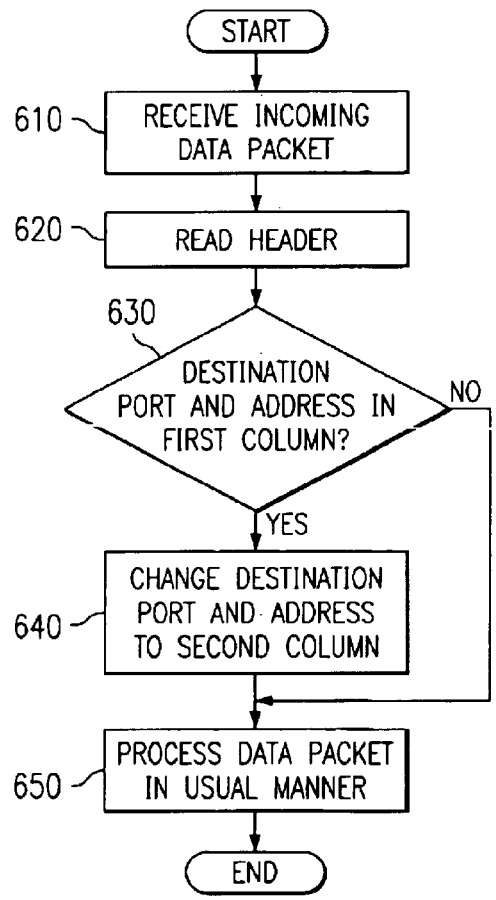
FIG. 5 is an exemplary diagram of a mapping table according to the present invention.
FIG. 6 is a flowchart outlining an exemplary operation of the present invention when mapping port and address information for incoming data messages.
FIG. 7 is a flowchart outlining an exemplary operation of the present invention when mapping port and address information for outgoing data messages.

FIG. 5 is an exemplary diagram illustrating a mapping table according to the present invention. As shown in FIG. 5, the mapping table 500 includes a first column 510 that identifies a shared port and address for a server process and a second column 520 that identifies a configured port and address for the server process. When a data message is received from an external device that identifies the shared port and address in column 510 in the header of the data message, this shared port and address is mapped to the configured port and address in column 520. Likewise, when a server process sends an outgoing message, the source port and address in column 520 is mapped to the shared port and address in column 510.

FIG. 6 is a flowchart outlining an exemplary operation of the present invention when mapping port and address information for data messages received from external devices. As shown in FIG. 6, the operation starts with receiving an incoming data packet (step 610). The header of the data packet is read to identify the destination port and address (step 620). A determination is made as to whether the destination port and address are present in the first column of the mapping table (step 630). If so, the destination port and address is changed to the destination port and address in the corresponding entry in the second column of the mapping table (step 640). Thereafter, or if the destination port and address are not present in the first column of the mapping table, processing is continued in the usual manner (step 650) and the operation ends.

FIG. 7 is a flowchart outlining an exemplary operation of the present invention when sending an outgoing message from a server process. As shown in FIG. 7, the operation starts with receipt of an outgoing data packet from a server process (step 710). Thereafter, the header of the data packet is read to identify the source port and address (step 720). A determination is made as to whether the source port and address are present in the second column of the mapping table (step 730). If so, the source port and address is changed to the source port and address in the corresponding entry in the first column of the mapping table (step 740). Thereafter, or if the source port and address is not present in the second column of the mapping table, processing is continue in the usual manner (step 750) and the operation ends.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of port sharing among a plurality of processes running on a server, the method comprising the steps of:
   in a port-mapping program located on a server and configured between a shared port and a plurality of processes running on said server, receiving an incoming data packet having a header containing a first port number and a first address of a process;
   comparing said first port number and said first address to entries in a port-sharing-table that contains, for each of said plurality of processes that share a port, a respective shared port number, a respective address, and a respective assigned port number; and
   if said first port number and said first address are equal to a respective shared port number and a respective address for a given process, replacing said first port number in said header with a respective assigned port number for said given process.

2. The method of claim 1, wherein first address and said respective addresses each identify domain names for a process of said plurality of processes.

3. The method of claim 1, wherein said port-mapping program is implemented in an operating system.

4. The method of claim 1, wherein said port-mapping program is implemented in a program that nuts in conjunction with an operating system.

5. The method of claim 1, wherein said port-mapping program is implemented in hardware.

6. A method of sharing a port among a plurality of processes on a server, the method comprising the steps of:
   in a port-mapping program located on a server and configured between a shared port and a plurality of processes running on said server, receiving an outgoing data packet having a header containing a first port number and a first address of a process;
   comparing said first port number and said first address to entries in a port-sharing-table that contains, for each of said plurality of processes that share a port, a respective shared port number, a respective address, and a respective assigned port number; and
   if said first port number and said first address are equal to a respective assigned port number and a respective address for a given process, replacing said first port number in said header with a respective shared port number for said given process.

7. The method of claim 6, wherein first address and said respective addresses each identify domain names for a process of said plurality of processes.

8. The method of claim 6, wherein said port-mapping program is implemented in an operating system.

9. The method of claim 6, wherein said port-mapping program is implemented in a program that runs in conjunction with an operating system.

10. The method of claim 6, wherein said port-mapping program is implemented in hardware.

11. A server configured for port sharing among a plurality of processes, comprising:
- a processor;
- a memory connected to be accessed by said processor,
- a port configured to carry information between said processor and an external bus;
- a plurality of processes configured to execute on said processor; and
- a port-mapping program configured between said port and said plurality of processes, wherein said port-mapping program contains
   - first instructions for receiving an incoming packet having a header containing a first port number and a first address of a process;
   - second instructions for comparing said first port number and said first address to entries in a port-sharing-table that contains, for each of said plurality of processes that share a port, a respective shared port number, a respective address, and a respective assigned port number; and
   - third instructions for, if said first port number and said first address are equal to a respective shared port number and a respective address for a given process, replacing said first port number in said header with a respective assigned port number for said given process.

12. The server of claim 11, wherein first address and said respective addresses each identify domain names for a process of said plurality of processes.

13. The server of claim 11, wherein said port-mapping program is implemented in an operating system.

14. The server of claim 11, wherein said port-mapping program is implemented in a program that runs in conjunction with an operating system.

15. The server of claim 11, wherein said port-mapping program is implemented in hardware.

16. A server configured for port sharing among a plurality of processes, comprising:
- a processor;
- a memory connected to be accessed by said processor;
- a port configured to carry information between said processor and an external bus;
- a plurality of processes configured to execute on said processor; and
- a port-mapping program configured between said port and said plurality of processes, wherein said port-mapping program contains
   - first instructions for receiving an outgoing packet having a header containing a first port number and a first address of a process;
   - second instructions for comparing said first port number and said first address to entries in a port-sharing-table that contains, for each of said plurality of processes that share a port, a respective shared port number, a respective address, and a respective assigned port number; and
   - third instructions for, if said first port number and said first address are equal to a respective shared port number and a respective address for a given process, replacing said first port number in said header with a respective shared port number for said given process.

17. The server of claim 16, wherein first address and said respective addresses each identify domain names for a process of said plurality of processes.

18. The server of claim 16, wherein said port-mapping program is implemented in an operating system.

19. The server of claim 16, wherein said port-mapping program is implemented in a program that runs in conjunction with an operating system.

20. The server of claim 16, wherein said port-mapping program is implemented in hardware.

21. A computer program product in a tangible computer readable medium for port sharing among a plurality of processes, comprising:
- first instructions for receiving an incoming packet having a header containing a first port number and a first address of a process;
- second instructions for comparing said first port number and said first address to entries in a port-sharing-table that contains, for each of said plurality of processes that share a port, a respective shared port number, a respective address, and a respective assigned port number; and
- third instructions for, if said first port number and said first address are equal to a respective shared port number and a respective address for a given process, replacing said first port number in said header with a respective assigned port number for said given process.

22. The computer program product of claim 21, wherein first address and said respective addresses each identify domain names for a process of said plurality of processes.

23. The computer program product of claim 21, wherein said computer program is configured to run as part of an operating system.

24. The computer program product of claim 21, wherein said computer program is configured to run as a program that runs in conjunction with an operating system.

25. The computer program product of claim 21, wherein said first, second, and third instructions are coded in hardware.

26. A computer program product in a tangible computer readable medium for port sharing among a plurality of processes, comprising:
- first instructions for receiving an incoming packet having a header containing a first port number and a first address of a process;
- second instructions for comparing said first port number and said first address to entries in a port-sharing-table that contains, for each of said plurality of processes that share a port, a respective shared port number, a respective address, and a respective assigned port number; and
- third instructions for, if said first port number and said first address are equal to a respective shared port number and a respective address for a given process, replacing said first port number in said header with a respective assigned port number for said given process.

27. The computer program product of claim 26, wherein first address and said respective addresses each identify domain names for a process of said plurality of processes.

28. The computer program product of claim 26, wherein said computer program is configured to run as part of an operating system.

29. The computer program product of claim 26, wherein said computer program is configured to run as a stand-alone program that runs in conjunction with an operating system.

30. The computer program product of claim 26, wherein said first, second, and third instructions are in hardware.

* * * * *

UNITED STATES PATENT AND TRADEMARK OFFICE
CERTIFICATE OF CORRECTION

PATENT NO. : 6,950,873 B2  Page 1 of 1
APPLICATION NO. : 09/920457
DATED : September 27, 2005
INVENTOR(S) : Jain et al.

It is certified that error appears in the above-identified patent and that said Letters Patent is hereby corrected as shown below:

(54) Title and Col. 1, line 2: after "SHARING" insert --AMONG--.

Col. 8, line 45: after "that" delete "nuts" and insert --runs--.

Signed and Sealed this

Fourteenth Day of November, 2006

JON W. DUDAS
*Director of the United States Patent and Trademark Office*